United States Patent
Huang et al.

(10) Patent No.: US 8,391,211 B2
(45) Date of Patent: Mar. 5, 2013

(54) METHODS FOR HANDLING DATA TRANSMISSION BY A MOBILE STATION WITH MULTIPLE RADIO FREQUENCY TRANSCEIVERS AND SYSTEMS UTILIZING THE SAME

(75) Inventors: Li-Chi Huang, Taipei Hsien (TW); Chen-Hsuan Lee, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 717 days.

(21) Appl. No.: 12/535,022

(22) Filed: Aug. 4, 2009

(65) Prior Publication Data

US 2011/0032868 A1 Feb. 10, 2011

(51) Int. Cl.
*H04W 40/00* (2009.01)
(52) U.S. Cl. ....................................................... 370/328
(58) Field of Classification Search .................... 370/328
See application file for complete search history.

(56) References Cited

U.S. PATENT DOCUMENTS

| 7,466,674 | B2 | 12/2008 | Okagawa et al. | |
|---|---|---|---|---|
| 2003/0088767 | A1* | 5/2003 | Emerson, III | 713/153 |
| 2003/0125073 | A1 | 7/2003 | Tsai et al. | |
| 2005/0176466 | A1* | 8/2005 | Verloop et al. | 455/558 |
| 2008/0293394 | A1 | 11/2008 | Silver et al. | |
| 2011/0281589 | A1* | 11/2011 | De Beer | 455/445 |

FOREIGN PATENT DOCUMENTS

CN 1496154 5/2004

* cited by examiner

*Primary Examiner* — Sulaiman Nooristany
(74) *Attorney, Agent, or Firm* — McClure, Qualey & Rodack, LLP

(57) ABSTRACT

A method for handling data transmission by a mobile station with a first RF module and second RF module is provided. The mobile station is coupled to a computer acquiring an IP address IP(U). A packet with a source IP address IP(U) and a destination IP address IP(Y) corresponding to an access network is received by the mobile station. The first RF module is assigned to transmit the received packet by replacing the source IP address IP(U) with a source IP address IP(A). Another packet with the source IP address IP(U) and destination IP address IP(Y) is assigned to the second RF module, and the source IP address IP(U) is replaced by a source IP address IP(B). The replaced packets are transmitted to the access network via the first and second RF module respectively.

15 Claims, 11 Drawing Sheets

METHODS FOR HANDLING DATA TRANSMISSION BY A MOBILE STATION WITH MULTIPLE RADIO FREQUENCY TRANSCEIVERS AND SYSTEMS UTILIZING THE SAME

BACKGROUND OF THE INVENTION

1. Field of the Invention

The invention relates to a method for handling data transmission, and more particularly to a method for handling data transmission by a mobile station having multiple radio frequency transceivers equipped multiple subscriber identity cards.

2. Description of the Related Art

Currently, the Global System for Mobile communication (GSM) standard is the most popular standard for mobile phones in the world. The GSM standard, standardized by the European Telecommunication Standards Institute (ETSI) defines a cellular network structure based on a Time Division Multiple Access (TDMA) system. For a carrier frequency, the GSM system will divide a frame into eight time slots, wherein each time slot is used to transmit channel data for a subscriber. In addition, one of the available technologies based on the infrastructure of a GSM network is the General Packet Radio Service (GPRS) technology. The GPRS technology utilizes channels in the GSM network to provide moderate speed data transmission through packet switched scheme. Meanwhile, the Wideband Code Division Multiple Access (W-CDMA) is a wideband spread-spectrum mobile air interface, which utilizes the direct-sequence spread spectrum method of asynchronous code division multiple access, to achieve higher network speeds and support more users compared to Time Division Multiple Access (TDMA) systems such as the GSM networks. Additionally, the Time Division-Synchronous Code Division Multiple Access (TD-SCDMA) is another type of 3G mobile telecommunications standard.

A dual SIM mobile phone is a cell phone capable of equipping two Subscriber Identity Modules (SIMs) cards, which correspond to different phone numbers. The dual SIM mobile phone with two radio transceivers allows a user to access two cellular networks for communication services without having to carry two phones. The mobile phone can establish two wireless communication bearers, either circuit switch or packet switch, between user and network controllers at the same time. For example, the same mobile phone may be used for both business and private use with separate numbers and billings, thus providing convenience to mobile phone users.

BRIEF SUMMARY OF THE INVENTION

Methods for handling data transmission by a mobile station with two or more radio transceiver equipped with multiple subscriber identity cards and the systems utilizing the same are provided. An exemplary embodiment of a method for handling data transmission by a mobile station with a first radio frequency (RF) module coupled to a first subscriber identity card and a second RF module coupled to a second subscriber identity card is provided. The first RF module is assigned to transmit a first packet originally having a source IP address IP(U) and a destination IP address IP(Y) corresponding to an access network. The source IP address IP(U) of the first packet is replaced with a source IP address IP(A) corresponding to the first RF module. The replaced first packet is transmitted to the access network via the first RF module. The second RF module is assigned to transmit a second packet originally having the source IP address IP(U) and the destination IP address IP(Y). The source IP address IP(U) of the second packet is replaced with a source IP address IP(B) corresponding to the second RF module. The replaced second packet is transmitted to the access network via the second RF module.

Another exemplary embodiment of a method for handling data transmission by a mobile station with a first radio frequency (RF) module coupled to a first subscriber identity card and a second RF module coupled to a second subscriber identity card is provided. The first RF module is assigned to transmit a first packet originally having a source IP address IP(U) and a destination IP address IP(Y) corresponding to an access network. The first packet is tunneled with a first new packet header comprising a source IP address IP(A) and a destination IP address IP(W). The tunneled first packet is transmitted to the access network via the first RF module. The second RF module is assigned to transmit a second packet originally having the source IP address IP(U) and the destination IP address IP(Y). The second packet is tunneled with a second new packet header comprising a source IP address IP(B) and the destination IP address IP(W). The tunneled second packet is transmitted to the access network via the second RF module.

Meanwhile, an exemplary embodiment of a system for handling data transmission between a mobile station with two radio frequency (RF) modules and an access network is provided. The embodiment of the system comprises a first radio frequency (RF) module coupled to a first subscriber identity card, corresponding to an IP address IP(A), a second radio frequency (RF) module coupled to a second subscriber identity card, corresponding to an IP address IP(B), and a processor. The processor performs network address translation (NAT) to assign a portion of packets to be transmitted by the first RF module and assign another portion of packets to be transmitted by the second RF module. The processor replaces a source IP address of a packet with IP(A) if assigning to the first RF module, and replaces with IP(B) if assigning to the second RF module.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
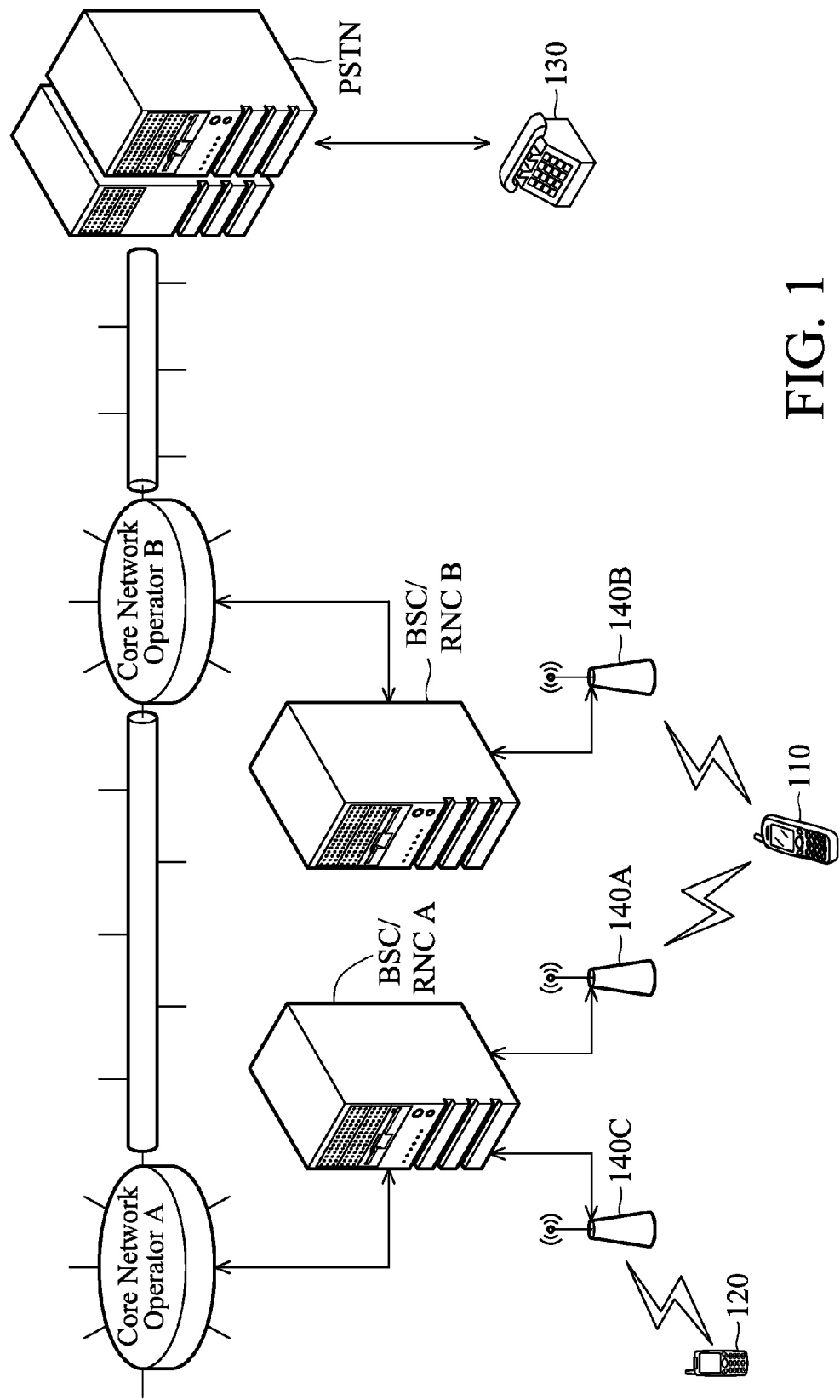
FIG. 1 shows a schematic diagram of a mobile communication network system.

The following description is of the best-contemplated mode of carrying out the invention. This description is made for the purpose of illustrating the general principles of the invention and should not be taken in a limiting sense. The scope of the invention is best determined by reference to the appended claims.

A subscriber identity module (SIM) card typically contains user account information, an international mobile subscriber identity (IMSI) and a set of SIM application toolkit (SAT) commands and provides storage space for phone book contacts. A micro-processing unit (MCU) of the Baseband chip (simply referred to as a Baseband MCU hereinafter) may interact with MCUs of the SIM cards (each simply referred to as a SIM MCU hereinafter) to fetch data or SAT commands from the plugged in SIM cards. A mobile station is immediately programmed after plugging in the SIM card. SIM cards may also be programmed to display custom menus for personalized services.

A universal SIM (USIM) card is inserted into a mobile station for universal mobile telecommunications system (UMTS) (also called 3G) telephony communications. The USIM card stores user account information, an IMSI, authentication information and a set of USIM Application Toolkit (USAT) commands and provides storage space for text messages and phone book contacts. A Baseband MCU may interact with an MCU of the USIM card (each simply referred to as a USIM MCU hereinafter) to fetch data or SAT commands from the plugged in USIM cards. The phone book on the USIM card has been greatly enhanced when compared to the SIM card. For authentication purposes, the USIM card may store a long-term pre-shared secret key K, which is shared with the Authentication Center (AuC) in the network. The USIM MCU may verify a sequence number that must be within a range using a window mechanism to avoid replay attacks, and is responsible for generating the session keys CK and IK to be used in the confidentiality and integrity algorithms of the KASUMI (also termed A5/3) block cipher in the UMTS. A mobile station is immediately programmed after plugging in the USIM card.

A removable User Identity Module (R-UIM) or a Code Division Multiple Access (CDMA) Subscriber Identity Module (CSIM) card has been developed for a CDMA mobile station and is equivalent to the GSM SIM and 3G USIM except that it is capable of working in CDMA networks. The R-UIM or the CSIM card is physically compatible with the GSM SIM card, and provides similar security mechanisms for the CDMA system. The IMSI is a unique number associated with a global system for mobile communication (GSM) or a universal mobile telecommunications system (UMTS) network user. The IMSI may be sent by a mobile station to a GSM or UMTS network to acquire other details of the mobile user in the Home Location Register (HLR) or as locally copied in the Visitor Location Register (VLR). An IMSI is typically 15 digits long, but may be shorter (for example MTN South Africa's IMSIs are 14 digits). The first 3 digits are the Mobile Country Code (MCC), which are followed by the Mobile Network Code (MNC), either 2 digits (European standard) or 3 digits (North American standard). The remaining digits are the mobile subscriber identification number (MSIN) for a GSM or UMTS network user.

FIG. 1 shows a schematic diagram of a mobile communication network system. In FIG. 1, a mobile station (may be called user equipment interchangeably) 110 with dual subscriber identity cards A and B may simultaneously access two core networks such as a Global System for Mobile Communications (GSM), Wideband Code Division Multiple Access (WCDMA), Time Division-Synchronous Code Division Multiple Access (TD-SCDMA) and the like after camping on two cells 140A and 140B (i.e. each may be a base station or others). The subscriber identity card may be a SIM, USIM, R-UIM or CSIM card. The mobile station 110 may make a voice or data call to a called party 120 or 130 through the GSM network with the Base Station Controller (BSC), WCDMA/TD-SCDMA network with Radio Network Controller (RNC), Public Switched Telephone Network (PSTN) or any combinations thereof using either subscriber identity cards A or B. For example, the mobile station 110 may make a voice call with the subscriber identity card A to the called party 120 via the cell 140A, a BSC/RNC A and a cell 140C or make a voice call with the subscriber identity card B to the called party 120 via the cell 140B, a BSC/RNC B, a core network operator B, a core network operator A, the BSC/RNC A and the cell 140C. Moreover, the mobile station 110 may receive a phone call request with either subscriber identity card A or B from the calling party 120 or 130. For example, the mobile station 110 may receive a phone call request to the subscriber identity card B from the calling party 130 via a Public Switched Telephone Network (PSTN), the core network operator B, the BSC/RNC B and the cell 140B.

Figure 2:
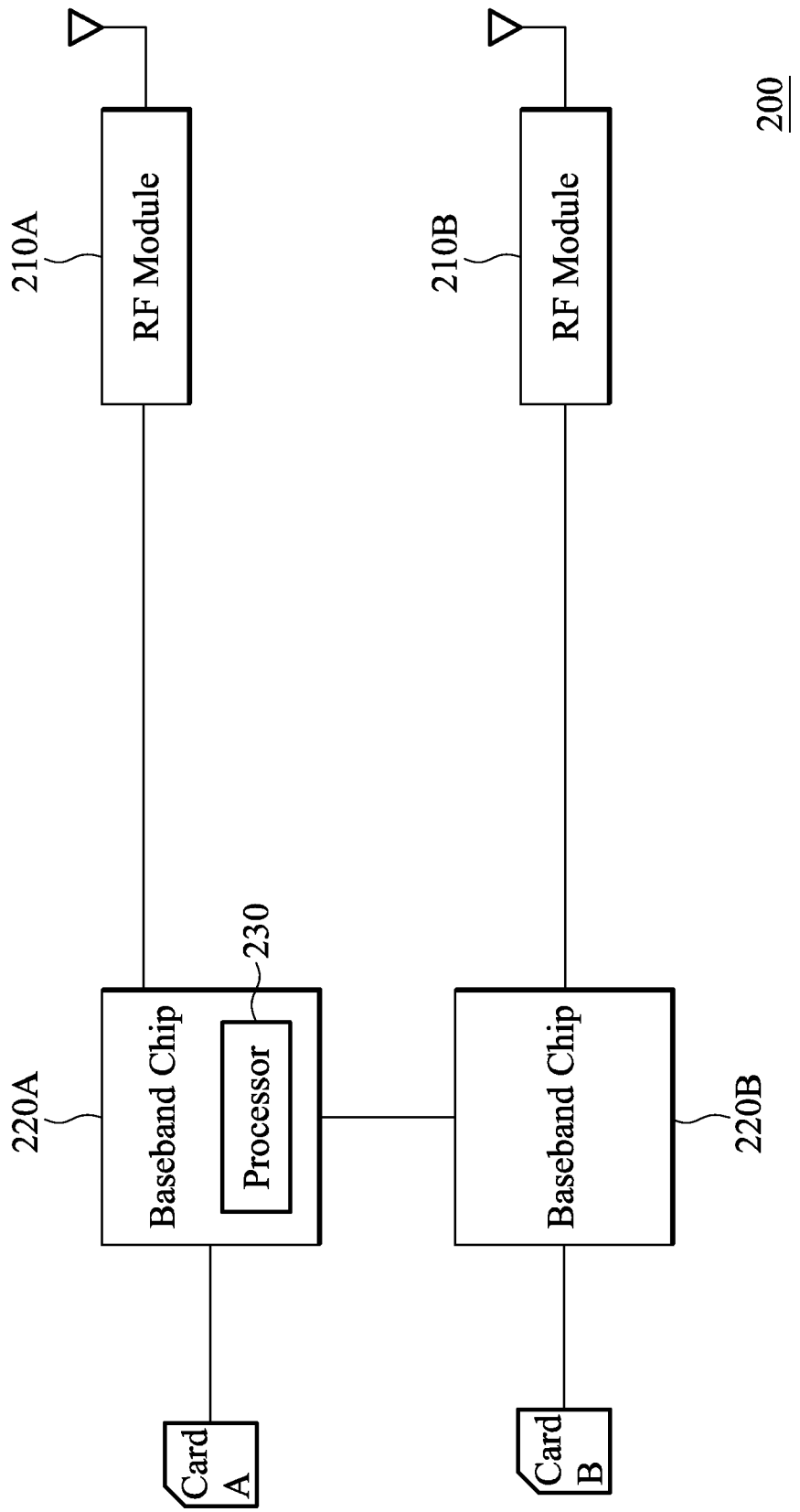
FIG. 2 shows the hardware architecture of a mobile station according to an embodiment of the invention.

FIG. 2 shows the hardware architecture of a mobile station 200 according to an embodiment of the invention. The mobile station 200 comprises two radio frequency (RF) modules 210A and 210 B and two Baseband modules 220A and 220B, wherein the RF module 210A is coupled to the Baseband chip 220A and the RF module 210B is coupled to the Baseband chip 220B. Two subscriber identity cards A and B may be plugged into two sockets of the mobile station 200 connected to the Baseband chips 220A and 220B, respectively. Each of the subscriber identity cards A and B may be a SIM, USIM, R-UIM or CSIM card, which is provided by a particular network operator. The mobile station 200 can therefore simultaneously camp on the same cell provided by a network operator or two cells provided by either the same network operator or different network operators for the plugged cards A and B and operate in stand-by/idle modes, or even dedicated modes. Each of the Baseband chips 220A and 220B may read data from a particular subscriber identity card A or B and write data to the subscriber identity card A or B. Furthermore, the Baseband chip 220A may be a master device for the mobile station 200, and the Baseband chip 220A comprises a processor 230 for controlling the communications between the subscriber identity cards A and B and the RF modules 210A and 210 B. A further processor (not shown) may be provided in the Baseband chip 220B to coordinately operate with the processor 230 of the Baseband chip 220A. In this embodiment, the Baseband chip 220A may camp on a first cell corresponding to the subscriber identity card A via the RF module 210A, and the Baseband chip 220B may camp on a second cell corresponding to the subscriber identity card B via the RF module 210B, wherein the first and second cells may be provided by different network operators.

For the mobile station equipped with one or more SIM cards as shown in FIG. 2, the mobile station can be operated in idle mode or dedicated mode for each inserted SIM card. Referring to FIG. 1, in idle mode, the mobile station 110 is either powered off, or searches for or measures the Broadcast Control Channel (BCCH) with better signal quality from a base station (e.g. cell 140A or cell 140B) provided by a specific network operator, or is synchronized to the BCCH of a specific base station and ready to perform a random access procedure on the Random Access Channel (RACH) for requesting a dedicated channel. In dedicated mode, the mobile station occupies a physical channel and tries to synchronize therewith, and establishes logical channels and switches among them.

Specifically, for each inserted SIM card in an idle mode, the mobile station continuously listens to the BCCH from a base station and reads the BCCH information and conducts periodic measurements of the signaling strength of the BCCH carriers in order to select a cell to be camped on. In the idle mode, no exchange of signaling messages is presented with the network. The data required for Radio Resource Management (RR) and other signaling procedures is collected and stored, such as the list of neighboring BCCH carriers, thresholds for RR algorithms, Common Control Channel (CCCH) configurations, information regarding the use of RACH and Paging channel (PCH), or others. Such kind of information is broadcast by a base station system on the BCCH, called SYSTEM INFORMATION (SI), and is available to all mobile stations currently in the cell. The SI comprises a Public-Land-Mobile-Network (PLMN) code uniquely owned by a network operator. The PLMN code comprising a Mobile Country Code (MCC) and a Mobile Network Code (MNC), of which a network operator provides communication services. In addition, a cell identity (ID) of which a cell broadcasts the BCCH is also contained in the SI. The PLMN code may be acquired and stored in a corresponding SIM card of the electronic device upon receiving the SI from the BCCH. The BSS further continuously sends on all PCHs of a cell, valid Layer 3 messages (PAGING REQUEST) which the mobile station can decode and recognize if its address (e.g. its IMSI of a specific SIM card) is paged. The mobile station periodical monitors the PCH to avoid paging call loss.

Each exchange of signaling messages with the network, e.g. BSS, Mobile Switching Center (MSC) and the similar, requires a Radio Resource Management (RR) connection and the establishment of an LAPDm connection between the mobile station and BSS. Setting up the RR connection can be initiated by the mobile station or network. For example, the mobile station sends a channel request (CHAN-QUEST) on the RACH in order to get a channel assigned on the Access Grant Channel (AGCH), also referred to as an immediate assignment procedure. The channel request may be rejected by an immediate assignment reject procedure. If the network does not immediately answer to the channel request, the request is repeated for a certain number of times. For a network-initiated connection, a procedure is preceded by a paging call (PAGING REQUEST) to be answered by the mobile station (PAGING RESPONSE). After an RR connection has been successfully completed, higher protocol layers, Connection Management (CM) and Mobility Management (MM) can receive and transmit signaling messages.

For the mobile station equipped with one or more USIM cards as shown in FIG. 2, the mobile station can be operated in an idle mode and connected mode for each inserted USIM card. Referring to FIG. 1, in an idle mode, the mobile station selects (either automatically or manually) a public land mobile network (PLMN) to contact. The mobile station continuously listens to Broadcast Control Channel (BCCH) to acquire SYSTEM INFORMATION (SI) comprising a Public-Land-Mobile-Network (PLMN) code uniquely owned by a network operator. The PLMN code comprising a Mobile Country Code (MCC) and a Mobile Network Code (MNC), of which a network operator provides communication services. In addition, a cell identity (ID) of which a cell broadcasts the BCCH is also contained in the SI. The PLMN code may be acquired and stored in a corresponding USIM card of the electronic device upon receiving the SI from the BCCH. The mobile station searches for a suitable cell of the chosen PLMN, chooses that cell to provide services, and tunes into its control channel, also referred to as "camping on a cell". After camping on a cell in the idle mode, the mobile station can receive system information and cell broadcast messages from a base station (e.g. cell 140A or cell 140B). The mobile station stays in the idle mode until the mobile station transmits a request or receives a paging to establish a Radio Resource Control (RRC) connection. In the idle mode, the mobile station is identified by non-access stratum identities such as IMSI, TMSI and P-TMSI.

In the Cell_DCH state of a connected mode, a dedicated physical channel is allocated to the mobile station, and the mobile station is known by its serving radio network controller (SRNC) on a cell or active set level. The mobile station performs measurements and sends measurement reports according to measurement control information received from the radio network controller (RNC). The mobile station with certain capabilities monitors the Forward Access Channel (FACH) for system information messages. In the Cell_FACH state of the connected mode, no dedicated physical channel is allocated for the mobile station, but Random Access Channel (RACH) and FACH are used instead, for transmitting both signaling messages and small amounts of user plane data. In this state, the mobile station also listens to the Broadcast Channel (BCH) to acquire system information. The mobile station performs cell reselections, and after a reselection typically sends a Cell Update message to the RNC, so that the RNC knows the mobile station location on a cell level. In the Cell_PCH state of the connected mode, the mobile station is known on a cell level in the Serving Radio Network Controller (SRNC), but the mobile station can be reached only via the Paging Channel (PCH). The URA_PCH state of the connected mode is very similar to the Cell_PCH state, except that the mobile station does not execute Cell Update after each cell reselection, but instead reads UMTS Terrestrial Radio Access Network (UTRAN) Registration Area (URA) identities from the BCH, and only if the URA changes (after cell reselection), does the mobile station inform its location to the SRNC. The mobile station leaves the connected mode and returns to the idle mode when the RRC connection is released or at RRC connection failure.

The establishment of an RRC connection and Signaling Radio Bearers (SRB) between the mobile station and UTRAN (RNC) is initiated by a request from higher layers (non-access stratum) on the mobile station side. For a network-originated case, the establishment is preceded by an RRC Paging message. The UTRAN (RNC) may respond with an RRC Connection Set-up message including a dedicated physical channel assignment for the mobile station (move to the Cell-FACH state), or a command to instruct the mobile station to use common channels (move to the Cell_FACH state).

General Packet Radio Service (GPRS) has been developed in GSM networks. GPRS provides wireless access to packet data networks. Networks based on the Internet Protocol (IP) (e.g. the global Internet or private/corporate intranets) and X.25 networks are supported. Before one of the (U)SIM cards A and B of a mobile station can use the GPRS service, the (U)SIM card of the mobile station attaches to the GPRS network. An ATTACH REQUEST message of the mobile station is sent to a Serving GPRS Support Node (SGSN). The GPRS network then checks if the mobile station is authorized, copies the user profile from the Home Location Register (HLR) to the SGSN, and assigns a Packet Temporary Mobile Subscriber Identity (P-TMSI) to the mobile station. The described procedure is called GPRS Attach.

Figure 3:
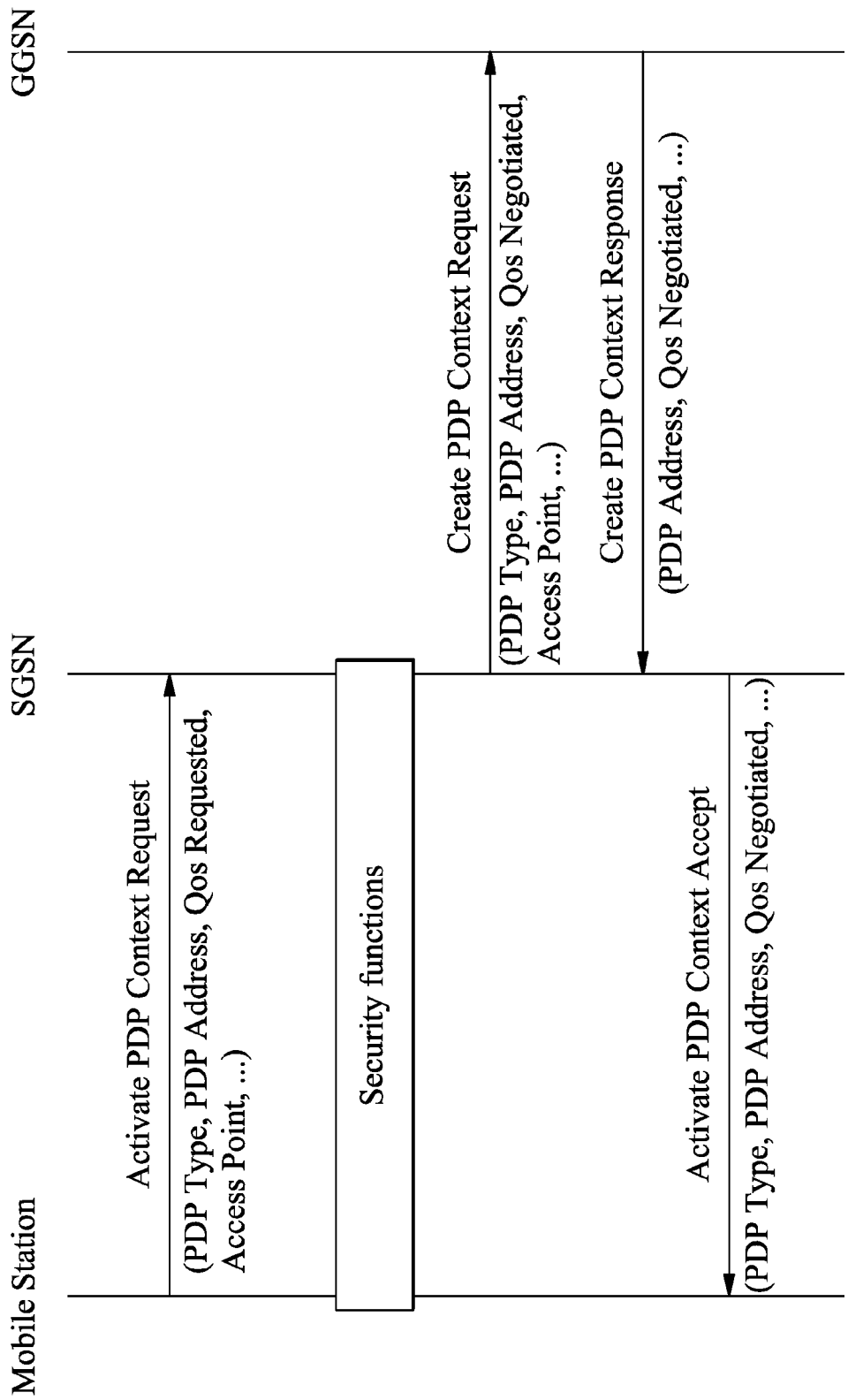
FIG. 3 shows the PDP context activation procedure initialized by the mobile station.

To exchange data packets with external Public Data Networks (PDNs) after a successful GPRS Attach, a mobile station applies for an address used in the PDN. The address is called a Packet Data Protocol (PDP) address. In the case where the PDN is an Internet Protocol (IP) network, the PDP address is an IP address. For each session, a so-called PDP context is created, which describes the characteristics of the session. The PDP context describes the PDP type (e.g. IPv4, IPv6 or others), the PDP address assigned to the a mobile station, the requested Quality of Service (QoS) class and the address of a Gateway GPRS Support Node (GGSN) that serves as the access point to the external network. FIG. 3 shows the PDP context activation procedure initialized by the mobile station. Using the message ACTIVATE PDP CONTEXT REQUEST, the mobile station informs the SGSN of the requested PDP context. After that, the typical GSM security functions (e.g. authentication of the mobile station) are performed. If access is granted, the SGSN will send a CREATE PDP CONTEXT REQUEST to the affected GGSN. The GGSN creates a new entry in its PDP context table, which enables the GGSN to route data packets between the SGSN and the external PDN. The GGSN confirms the request to the SGSN with a message CREATE PDP CONTEXT RESPONSE. Finally, the SGSN updates its PDP context table and confirms the activation of the new PDP context to the mobile station (ACTIVATE PDP CONTEXT ACCEPT). For the mobile station using both circuit switched and packet switched services, it is possible to perform combined GPRS/IMSI attachment procedures. The disconnection from the GPRS network is called GPRS Detach. It can be initiated by the mobile station or by the GPRS network.

IP packets are transmitted encapsulated within the GPRS backbone network. The transmission is achieved using the GPRS Tunneling Protocol (GTP), that is, GTP packets carry the user's IP packets. The GTP defines communications of both between the GPRS Supports Nodes (GSNs) within the same PLMN and between GSNs of different PLMNs. It contains procedures in the transmission plane as well as in the signaling plane. In the transmission plane, the GTP employs a tunnel mechanism to transfer user data packets. In the signaling plane, the GTP specifies a tunnel control and management protocol. The signaling is used to create, modify, and delete tunnels. A Tunnel Identifier (TID), which is composed of the IMSI of the (U)SIM card A or B and a Network Layer Service Access Point Identifier (NSAPI) uniquely indicates a PDP context. Below the GTP, the transmission control protocol (TCP) is employed to transport the GTP packets within the backbone network. In the network layer, the IP is employed to route the packets through the backbone.

Taking GSM as an example, after one SIM card of the MS successfully camp on the GPRS network, a cell supporting GPRS may allocate physical channels for GPRS traffic. In other words, the radio resources of a cell are shared by the (U)SIM card of the MS.

Figure 4:
FIG. 4 shows an uplink channel allocation (mobile originated packet transfer)

FIG. 4 shows an uplink channel allocation (mobile originated packet transfer). The attached subscriber identity card of the mobile station requests a channel by sending a PACKET CHANNEL REQUEST on the Packet Random Access Channel (PRACH) or RACH. The BSS answers on the Packet Access Grant Channel (PAGCH) or AGCH. Once the PACKET CHANNEL REQUEST is successful, a so-called Temporary Block Flow (TBF) is established. With that, resources (e.g. Packet Data Traffic Channel (PDTCH) and buffers) are allocated for the attached subscriber identity card of the mobile station, and data transmission can start. During transfer, the Uplink State Flag (USF) in the header of the downlink blocks indicates to other mobile stations that this uplink PDTCH is already in use. On the receiver side, a Temporary Flow Identifier (TFI) is used to reassemble the packet. Once all data has been transmitted, the TBF and the resources are released.

Figure 5:
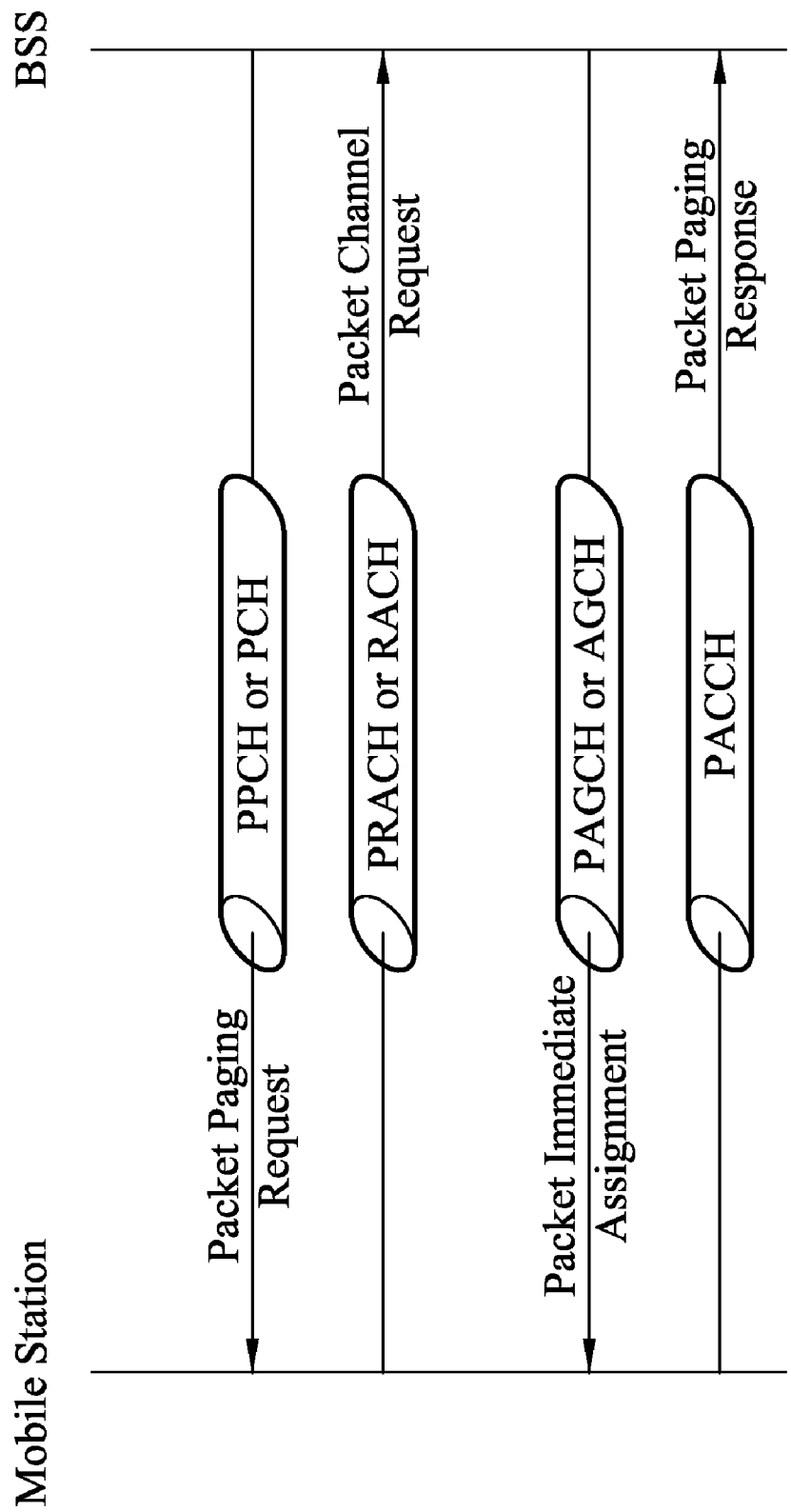
FIG. 5 shows an exemplary paging procedure of a subscriber identity card of a mobile station (mobile terminated packet transfer)

FIG. 5 shows an exemplary paging procedure of a subscriber identity card of a mobile station (mobile terminated packet transfer). The BSS pages the attached subscriber identity card of the mobile station by sending a PACKET PAGING REQUEST on the Packet Paging Channel (PPCH) or PCH. The attached subscriber identity card of the mobile station answers on the Packet Random Access Channel (PRACH) or RACH.

Figure 6:
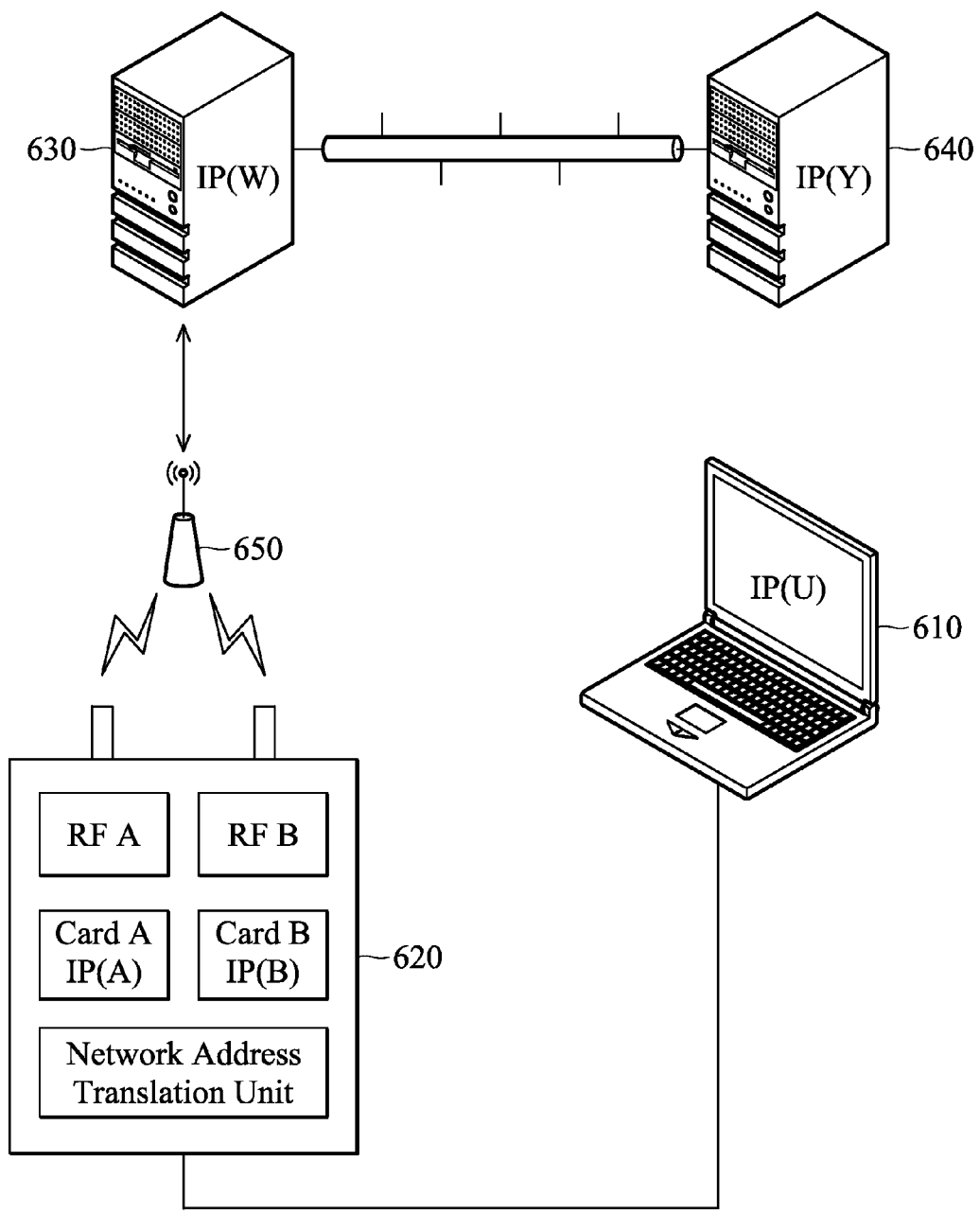
FIG. 6 shows a communication network system illustrating a computer host accessing an Internet access network via a connected mobile station according to an embodiment of the invention.

FIG. 6 shows a communication network system illustrating a computer host 610 accessing an Internet access network 640 via a connected mobile station 620 according to an embodiment of the invention. The computer 610 is connected with the mobile station 620, which has two subscriber identity cards A and B each corresponding to a dedicated Baseband chip and a RF module, as shown in FIG. 2. In the mobile station 620, a network address translation unit is used to handle data transmission between the computer 610 and the Internet access network 640. The network address translation unit may be implemented in a software core to be executed by one or more micro control units (MCUs), such as the processors described above, dedicated hardware circuits or the combination thereof. Each MCU may be installed in one of the Baseband chips or outside of the Baseband chips. Before actual data transmission, the subscriber identity cards A and B may register at the same or different wireless telecommunication networks respectively, such as a GSM, WCDMA, TD-SCDMA and the like, and camp on the same PLMN network. Moreover, the subscriber identity cards A and B obtain IP addresses, namely IP(A) and IP(B), respectively after the PDP Context Activation procedure shown in FIG. 3. The computer host 610, such as a computer, notebook, portable electronic device or other, may obtain an IP address IP(U) for accessing Internet resource. In some other embodiments, the user accesses the Internet using the mobile station 620 without connecting to a computer host 610, the outbound packets originally with an IP address IP(U) will be replaced by IP(A) and IP(B) for transmitting to the Internet access network 640 via two RF modules.

In FIG. 6, the subscriber identity cards A and B of the mobile station 620 camp on a network operator 630 via a cell 650 simultaneously, and the IP packets are transferred between the computer 610 and the Internet access network 640 via the mobile station 620, the cell 650 and the network operator 630. The IP packets may contain at least HyperText Transfer Protocol (HTTP), Wireless Application Protocol (WAP), File Transfer Protocol (FTP), Simple Mail Transfer Protocol (SMTP), Post Office Protocol 3 (POP3) or Internet Mail Protocol (IMAP) messages, or others. HTTP is used to request and transmit files, especially Web pages and Web page components, over the Internet or other computer network. WAP is a standard for providing cellular phones, pagers and other handheld devices with secure access to e-mail and text-based Web pages. FTP is used to transfer files on the Internet between client computers and file servers, where files may be transferred, downloaded, and uploaded individually or in batch form. SMTP defines the message format and the message transfer agent (MTA), which stores and forwards e-mail messages. POP3 and IMAP are the two common mailbox access protocols used for Internet e-mail. POP3 is a standard interface between an e-mail client program and the mail server. POP3 provides a message storage that holds incoming e-mail until users log in and download it. IMAP is an Internet standard for directly reading and manipulating e-mail messages stored on remote servers.

Figure 7:
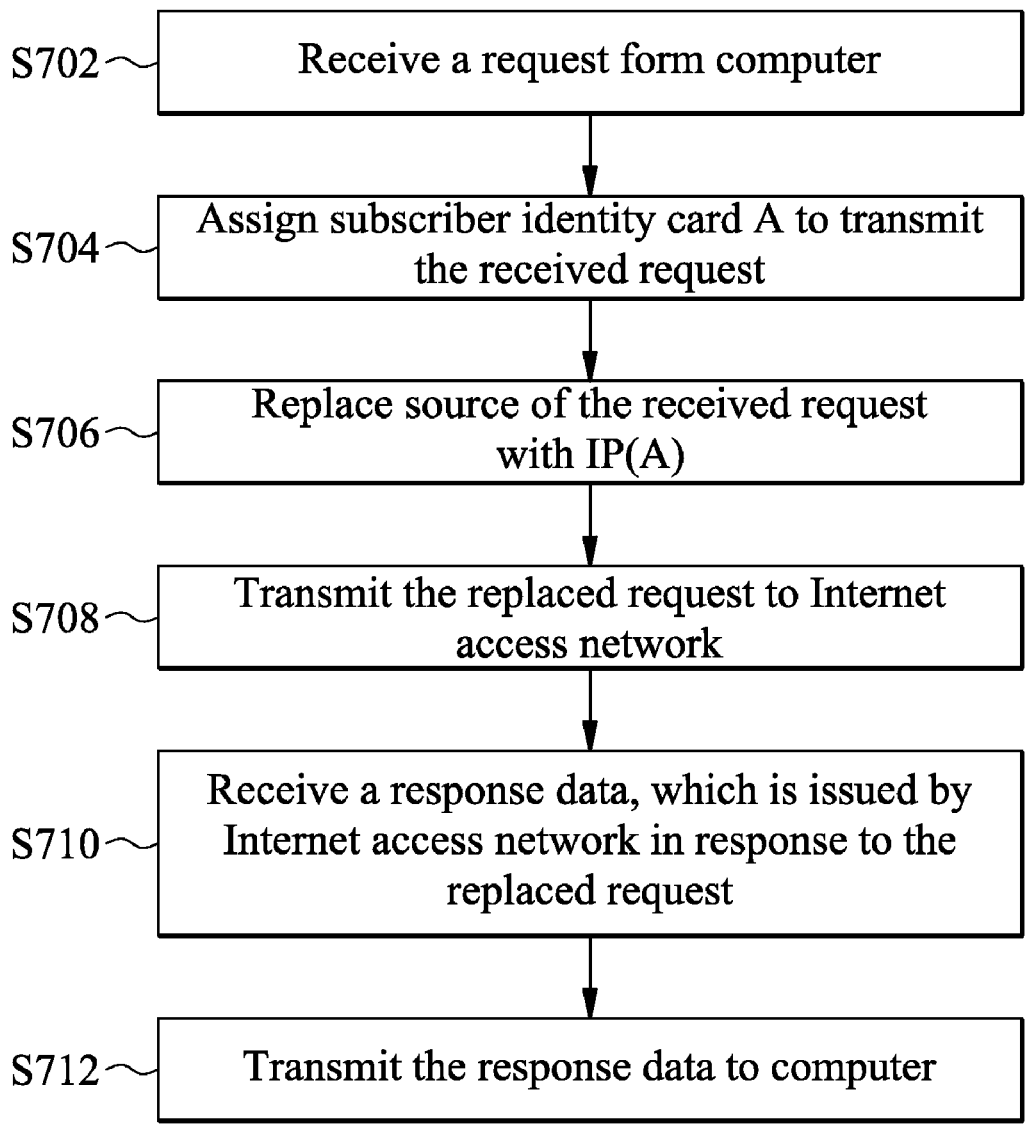
FIG. 7 shows a flow chart illustrating a method for handling data transmission by the mobile station according to the embodiment of FIG. 6.
Figure 8:
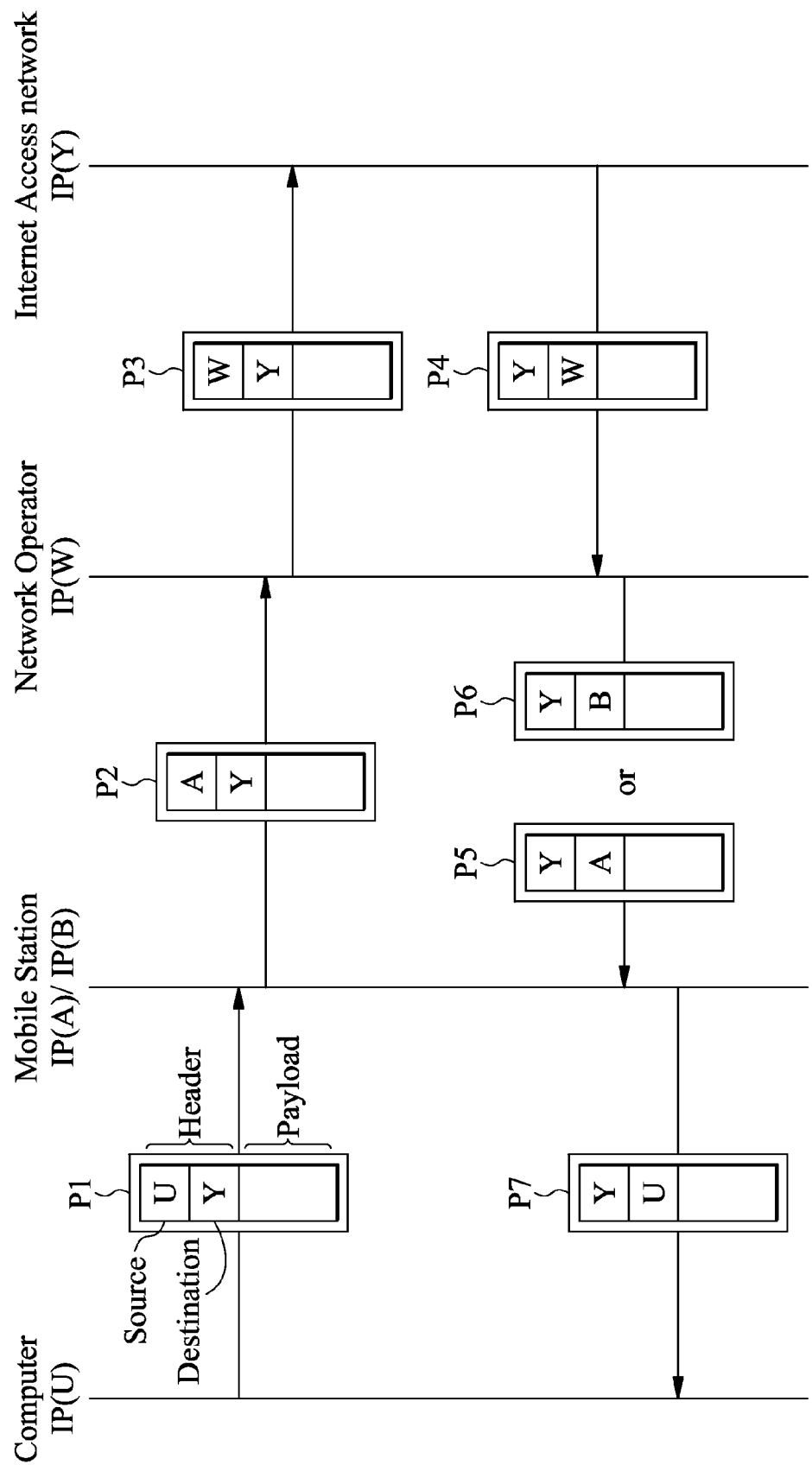
FIG. 8 shows a sequence diagram illustrating data transmission interactions between the computer and the Internet access network according to the embodiment of FIG. 6.

FIG. 7 shows a flow chart illustrating a method for handling data transmission by the mobile station 620 according to the embodiment of FIG. 6. FIG. 8 shows a sequence diagram illustrating data transmission interactions between the computer 610 and the Internet access network 640 according to the embodiment of FIG. 6. Referring to FIG. 6 together with FIG. 7 and FIG. 8, the computer 610 issues a request to the Internet access network 640 for requesting an application service, such as an HTTP, FTP, SMTP, POP3 or IMAP service. First, the request issued by the computer 610 is received by the mobile station 620 (step S702), wherein the received request comprises a header containing a source IP address IP(U) and a destination IP address IP(Y) and a payload, as shown in P1 of FIG. 8. After the request is received, the mobile station 620 may assign one of the subscriber identity cards to transmit the received request (step S704). In this embodiment, the subscriber identity card A is assigned to transmit the received request. Next, the network address translation unit of the mobile station 620 may perform a network address translation (NAT) procedure, which is a process to modify the network addresses of the packet headers, to replace the source of the received request with an IP address IP(A) (step S706). As known in the art, NAT (also known as network masquerading, native address translation or IP masquerading) is a technique of transceiving network traffic through a router that involves re-writing the source and/or destination IP address. In addition, a part of the payload (such as checksum) may also be modified to take account of the changes. Next, the mobile station 620 may transmit the replaced request (as shown in P2 of FIG. 8) to the Internet access network 640 via the subscriber identity card A, the cell 650 and the network operator 630 (step S708). Next, a response data containing a plurality of packets is received by the subscriber identity card A and the subscriber identity card B of the mobile station 620 (step S710), wherein the response data is issued by the Internet access network 640 via the network operator 630 in response to the replaced request. Next, the mobile station 620 may transmit the packets received by the subscriber identity cards A and B to the computer 610 for the request (step S712).

Moreover, the network operator 630 may also perform a network address translation procedure to replace a source address or a destination address of each packet transferred between the mobile station 620 and the Internet access network 640. For example, referring to FIG. 8, when the request transmitted by the mobile station 620 is passed through the network operator 630, the network operator 630 may perform a network address translation procedure to replace the source of the received request with the IP(W) and then may transmit the replaced request to the Internet access network 640, wherein the header of the replaced request comprises the source of the IP(W) and the destination of the IP(Y), as shown in P3 of FIG. 8. Furthermore, each packet issued by the Internet access network 640 comprises a source of the IP(Y) and a destination of the IP(W) as shown in P4 of FIG. 8. When the packets issued by the Internet access network 640 are passed through the network operator 630, the network operator 630 may perform a network address translation procedure to replace the destination of the packets with the IP(A) or IP(B). In this embodiment, for each received packet, the network operator 630 may determine which one of the IP(A) and IP(B) is to be utilized according to the traffic of the subscriber identity cards A and B of the mobile station 620, and then transmit the received packet to the mobile station 620 via the determined subscriber identity card and the corresponding RF module. For example, if the network operator 630 determines to transmit the received packet to the subscriber identity card A, the destination IP address of the packet destined to the subscriber identity card A is replaced with the IP(A), as shown in P5 of FIG. 8. Otherwise, the destination IP address of the packet destined to the subscriber identity card B is replaced with the IP(B), as shown in P6 of FIG. 8. Therefore, each of the packets received by the subscriber identity card A comprises a source of the IP(Y) and a destination of the IP(A), and each of the packets received by the subscriber identity card B comprises a source of the IP(Y) and a destination of the IP(B). Furthermore, before transmitting the packets received by the subscriber identity cards A and B to the computer 610 in step S712, the mobile station 620 may perform a network address translation procedure to replace the destination IP address of the packets with the IP(U) so as to transmit the packets to the computer 610. Therefore, the computer 610 may obtain the packets in response to the request, wherein each packet comprises a source of the IP(Y) and a destination of the IP(U), as shown in P7 of FIG. 8. In some other embodiments, the network operator 630 may not have the capability for load sharing, so it translates the destination IP address to a default IP address (e.g. IP(A)), or the network operator 630 may simply disable the load sharing function and always replace the destination address of the packet to the default IP address when entering a particular operation mode. For the currently existed network operators, the firmware or software can be upgraded to include the NAT algorithms without the need of upgrading hardware infrastructures.

The data transmission method increase the data throughputs by consolidating two wireless bearers with network address translation (NAT) algorithm, and since it is an IP layer transform, the method is not limited any particular physical layer protocol. The data transmission method can apply to communication protocols such as GSM, GPRS, WIFI, WIMAX, CDMA, LTE, and it is also applicable for the two (U)SIM operating in different communication protocols such as one using GSM and another using GPRS.

Figure 9:
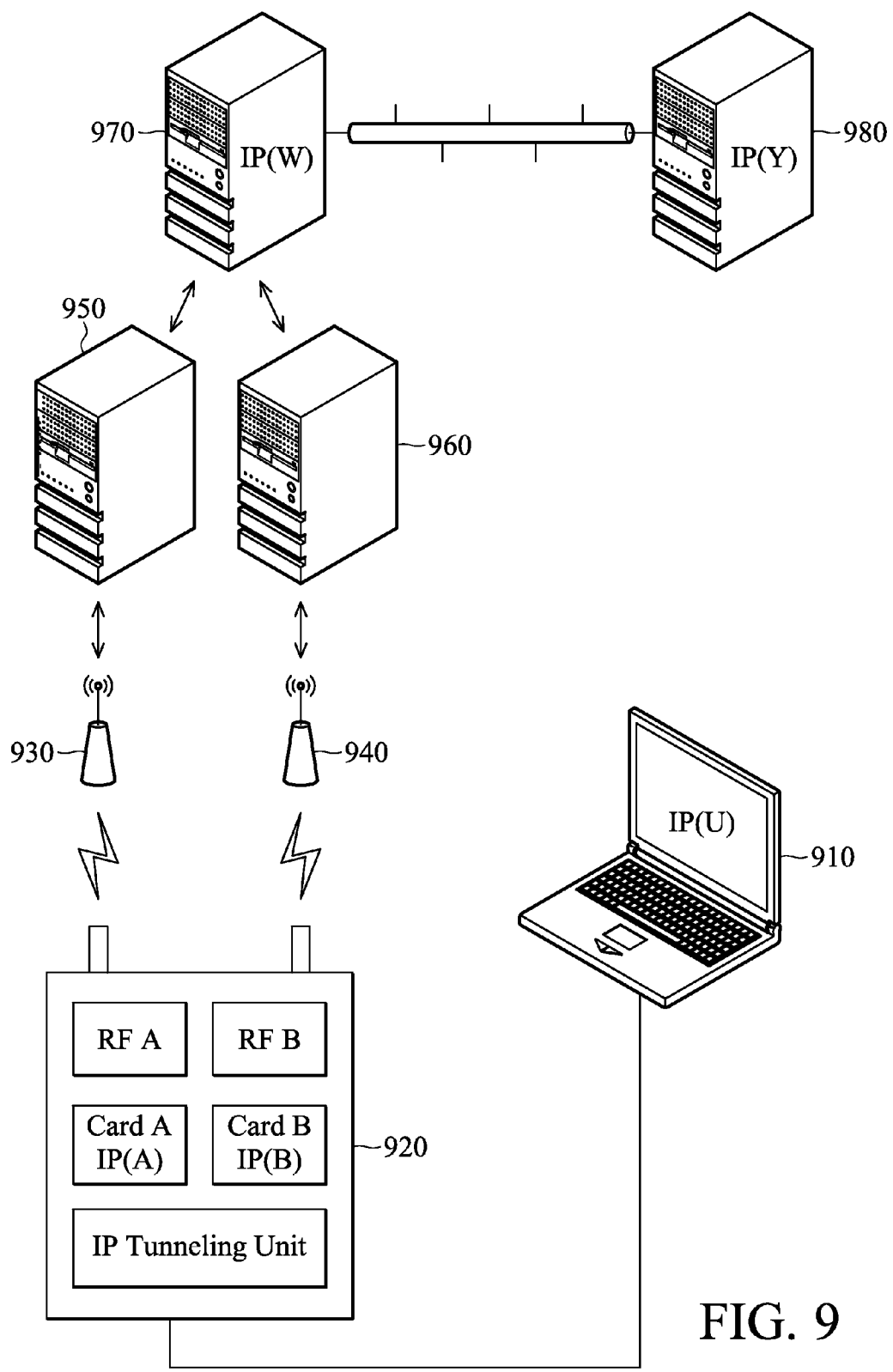
FIG. 9 shows a communication network system illustrating a computer host accessing an Internet access network via a connected mobile station according to another embodiment of the invention.

FIG. 9 shows a communication network system illustrating a computer host 910 accessing an Internet access network 980 via a connected mobile station 920 according to another embodiment of the invention. The computer 910 is connected with the mobile station 920, wherein the mobile station 920 has two subscriber identity cards A and B each corresponding to a dedicated Baseband chip and a RF module, as shown in FIG. 2. In the mobile station 920, an IP tunneling unit is introduced to handle data transmission through the two collaborated subscriber identity cards. The IP tunneling unit may be implemented in a software core to be executed by one or more micro control units (MCUs), such as the processors described above, dedicated hardware circuits or the combination thereof. Each MCU may be installed in one of the Baseband chips or outside of the Baseband chips. Before actual data transmission, the subscriber identity cards A and B may register at the same or different wireless telecommunication networks respectively, such as a GSM, WCDMA, TD-SCDMA and the like, and camp on the same or different PLMN networks. Moreover, the subscriber identity cards A and B obtain the IP addresses, namely IP(A) and IP(B), respectively after PDP Context Activation procedure shown in FIG. 3. The computer host 910, such as a computer, notebook, portable electronic device or processor in the mobile station 920, may obtain the IP (U) for accessing Internet resource. In FIG. 9, a network operator 950 is camped on by the subscriber identity card A of the mobile station 920 via a cell 930, and a network operator 960 is camped on by the subscriber identity card B of the mobile station 920 via a cell 940, wherein the network operators 950 and 960 belong to same or different network operators. The IP packets may be transferred between the computer 910 and the Internet access network 980 via the mobile station 920, the cell 930, the network operator 950, and a gateway server 970 or between the computer 910 and the Internet access network 980 via the mobile station 920, the cell 940, the network operator 960, and the gateway server 970.

Figure 10:
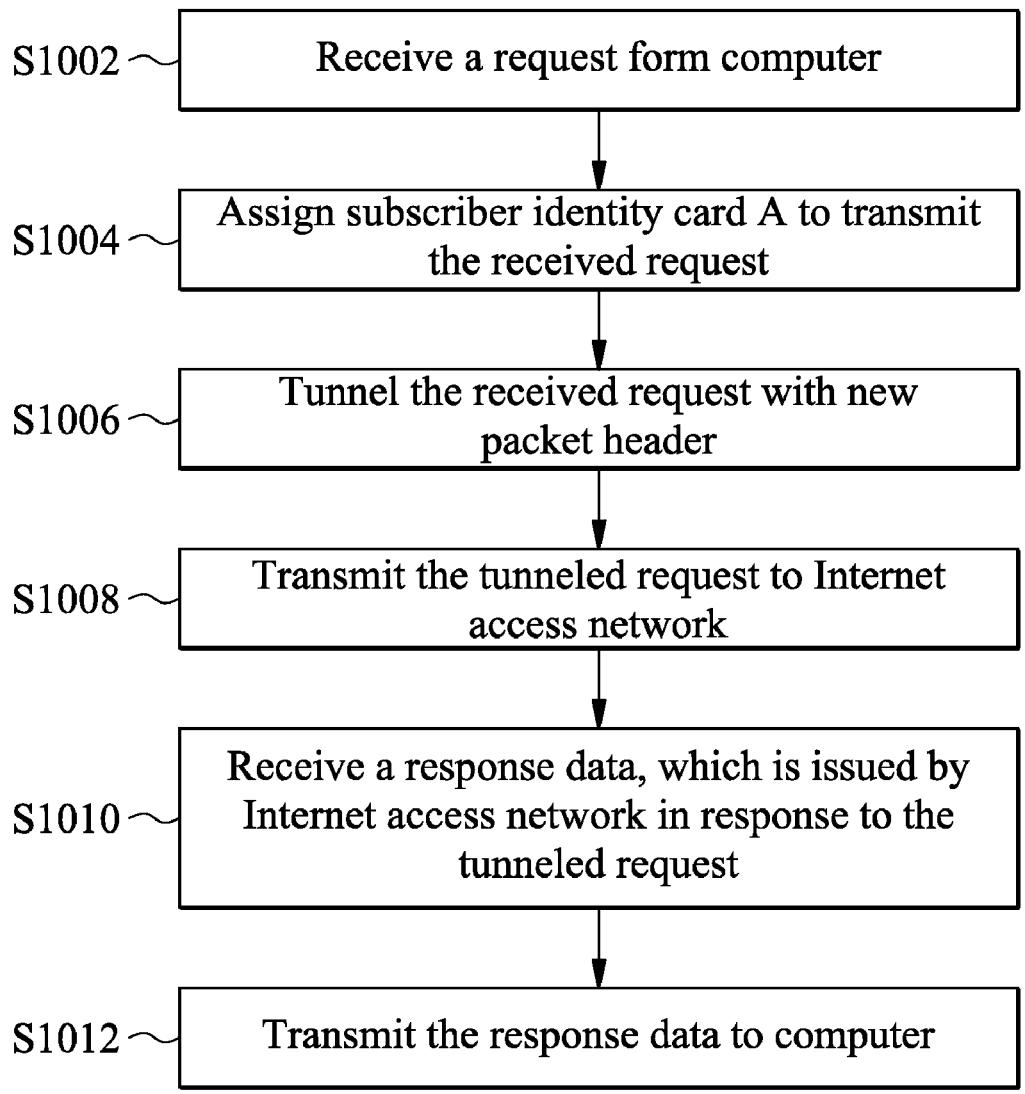
FIG. 10 shows a flow chart illustrating a method for handling data transmission by the mobile station according to the embodiment of FIG. 9.
Figure 11:
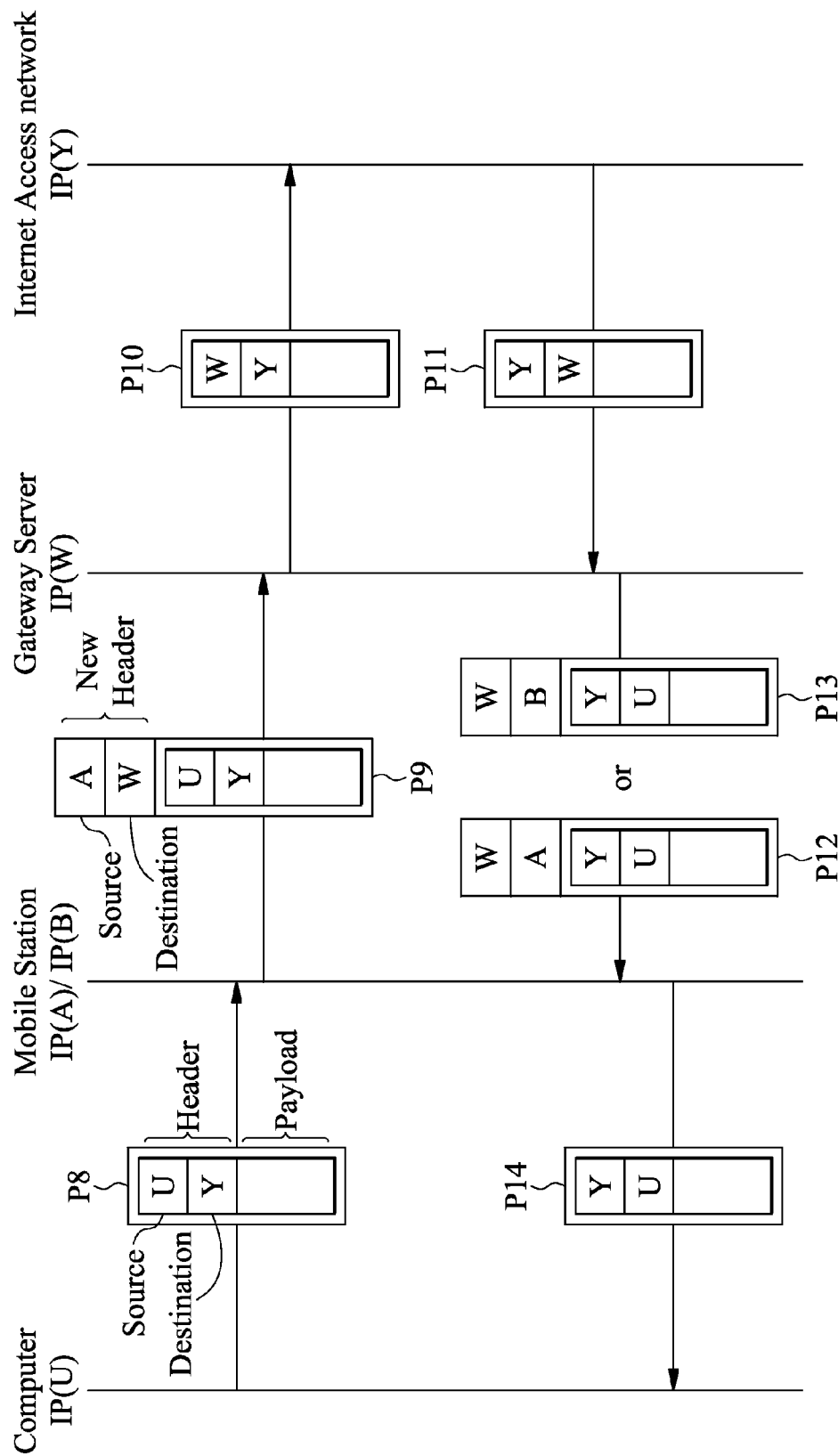
FIG. 11 shows a sequence diagram illustrating data transmission interactions between the computer and the Internet access network according to the embodiment of FIG. 9.

FIG. 10 shows a flow chart illustrating a method for handling data transmission by the mobile station 920 according to the embodiment of FIG. 9. FIG. 11 shows a sequence diagram illustrating data transmission interactions between the computer 910 and the Internet access network 980 according to the embodiment of FIG. 9. Referring to FIG. 9 together with FIG. 10 and FIG. 11, the computer 910 issues a request to the Internet access network 980 for requesting an application service, such as HTTP, FTP, SMTP, POP3 or IMAP service. First, the request issued by the computer 910 is received by the mobile station 920 (step S1002), wherein the received request comprises a header containing a source of the IP(U) and a destination of the IP(Y) and a payload, as shown in P8 of FIG. 11. When receiving the request, the mobile station 920 may assign one of the subscriber identity cards to transmit the received request (step S1004). In this embodiment, the subscriber identity card A is assigned to transmit the received request. Next, the IP tunneling unit of the mobile station 920 may perform an IP tunneling procedure to tunnel the received request with a new packet header containing a source of the IP(A) and a destination of the IP(W) (step S1006). Next, the mobile station 920 may transmit the tunneled request (as shown in P9 of FIG. 11) to the Internet access network 980 via the subscriber identity card A, the cell 930, the network operator 950 and the gateway server 970 (step S1008). Next, a response data containing a plurality of packets is received by the subscriber identity card A and the subscriber identity card B of the mobile station 920 (step S1010), wherein the response data is issued by the Internet access network 980 via the gateway server 970 in response to the tunneled request. Next, the mobile station 920 may transmit the packets received by the subscriber identity cards A and B to the computer 910 for the request (step S1012).

Referring to FIG. 11, when the request transmitted by the mobile station 920 is passed through the gateway server 970, the gateway server 970 may perform an IP de-tunneling procedure to de-tunnel the received request and then replaces the source IP address of the de-tunneled request with the IP(W). Thus, the received request received by the gateway server 970 is de-tunneled and the de-tunneled request comprises a source IP address IP(W) and the destination IP address IP(Y). Next, the gateway server 970 may transmit the de-tunneled request (as shown in P10 of FIG. 11) to the Internet access network 980. Furthermore, each packet issued by the Internet access network 980 comprises a source IP address IP(Y) and a destination IP address IP(W), as shown in P11 of FIG. 11. When the packets issued by the Internet access network 980 are passed through the gateway server 970, the gateway server 970 may replace the destination IP address of the packets with the IP(U), and perform an IP tunneling procedure to tunnel the replaced packets with a new packet header containing a source IP address IP(W) and a destination IP address IP(A) or IP(B). For each received packet, the gateway server 970 may determine which one of the IP(A) and IP(B) is to be utilized according to the traffic of the subscriber identity cards A and B of the mobile station 920, and transmit the tunneled packet to the mobile station 920 via the determined subscriber identity card and the corresponding RF module. For example, if the gateway server 970 determines to transmit the received packet to the subscriber identity card A via the network operation 950, the gateway server 970 may replace the destination of the received packet with the IP(U) and tunnel the replaced packet with the new packet header containing a source IP address IP(W) and a destination IP address IP(A), as shown in P12 of FIG. 11. Otherwise, the gateway server 970 may replace the destination IP address of the received packet with the IP(U) and tunnel the replaced packet with a new packet header containing a source IP address IP(W) and a destination IP address IP(B), as shown in P12 of FIG. 11. Furthermore, before transmitting the packets received by the subscriber identity cards A and B to the computer 910 in step S1012, the mobile station 920 may perform an IP de-tunneling procedure to de-tunnel the received packets. Therefore, the computer 910 may obtain the packets in response to the request, wherein each packet comprises a source IP address IP(Y) and a destination IP address IP(U), as shown in P14 of FIG. 11.

In some other embodiments, the functions performed by the gateway server 970 can be implemented at the Internet access network 980 instead of implementing at the operator side. In some embodiments, IP tunneling functions can be conducted by the computer 910 instead of the mobile station 920.

Since the data transmission handling methods of the present invention perform address transform at the IP layer, it is not a limit to which physical layer protocols are used. It is also possible for the network operator to combine data packets transmitted through different physical layer protocols, such as LTE, GSM, GPRS, WIFI, WIMAX, and CDMA. The data transmission handling methods speed up the data transmission rate of a dual RF mobile station by grouping two or more physical radio links into one logical TCP/IP link.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for handling data transmission by a mobile station with a first radio frequency (RF) module coupled to a first subscriber identity card and a second RF module coupled to a second subscriber identity card, comprising:

assigning the first RF module to transmit a first packet originally having a source IP address IP(U) and a destination IP address IP(Y) corresponding to an access network;

replacing the source IP address IP(U) of the first packet with a source IP address IP(A) corresponding to the first RF module;

assigning the second RF module to transmit a second packet originally having the source IP address IP(U) and the destination IP address IP(Y);

replacing the source IP address IP(U) of the second packet with a source IP address IP(B) corresponding to the second RF module;

transmitting the replaced first packet using the first subscriber identity card to the access network via the first RF module and the replaced second packet using the second subscriber identity card to the access network via the second RF module;

further comprises receiving a first response packet and a second response packet;

wherein the first response packet is received from the access network by the first RF module, wherein the first response packet has the source IP address IP(Y) and the destination IP address IP(A);

replacing the destination IP address IP(A) of the response packet with the destination IP address IP(U);

wherein the second response packet is received from the access network by the second RF module, wherein the second response packet has the source IP address IP(Y) and a destination IP address IP(B); and replacing the destination IP address IP(B) of the response packet with the destination IP address IP(U).

2. The method as claimed in claim 1, wherein a network operator with an IP address IP(W) is camped on by the first RF module and the second RF module, and the replaced packet is transmitted to the access network via the network operator.

3. The method as claimed in claim 2, wherein the network operator receives the first packet from the first subscriber identity card, replaces the source IP address IP(A) of the first packet with a source IP address IP(W), and transmits the replaced first packet to the access network.

4. The method as claimed in claim 2, wherein the access network issues a response packet via the network operator, the response packet has a source IP address IP(Y) and a destination IP address IP(W), and the access network replaces the destination IP address IP(W) of the response packet destined to the first subscriber identity card with the destination IP address IP(A), or replaces the response packet destined to the second subscriber identity with the destination IP address IP(B).

5. The method as claimed in claimed 1, wherein the first and second packet having the source IP address IP(U) are received from a computer coupled to the mobile station, and the method further comprising transmitting a response packet received from the access network to the computer.

6. A method for handling data transmission by a mobile station with a first radio frequency (RF) module coupled to a first subscriber identity card and a second RF module coupled to a second subscriber identity card, comprising:

assigning the first RF module to transmit a first packet originally having a source IP address IP(U) and a destination IP address IP(Y) corresponding to an access network;

tunneling the first packet with a first new packet header comprising a source IP address IP(A) corresponding to the first RF module and a destination IP address IP(W) corresponding to a gateway server;

transmitting the tunneled first packet using the first subscriber identity card to the gateway server via the first RF module and then from the gateway server to the access network;

assigning the second RF module to transmit a second packet originally having the source IP address IP(U) and the destination IP address IP(Y) corresponding to the access network;

tunneling the second packet with a second new packet header comprising a source IP address IP(B) corresponding to the second RF module and the destination IP address IP(W) corresponding to the gateway server;

transmitting the tunneled second packet using the second subscriber identity card to the gateway server via the second RF module and then from the gateway server to the access network;

further comprises receiving a first tunneled response packet and a second tunneled response packet from the access network by the gateway server;

wherein the received first tunneled response packet is then received from the gateway server by the first RF module, wherein the first tunneled response packet has the source IP address IP(W) and the destination IP address IP(A);

replacing the destination IP address IP(A) of the response packet with the destination IP address IP(U);

wherein the received second tunneled response packet is then received from the gateway server by the second RF module, wherein the second tunneled response packet has the source IP address IP(W) and a destination IP address IP(B); and replacing the destination IP address IP(B) of the tunneled response packet with the destination IP address IP(U).

7. The method as claimed in claim 6, wherein the tunneled first and second packets are received by the gateway server with the IP address IP(W).

8. The method as claimed in claim 7, further comprising receiving a packet having a third new packet header by the first RF module, which is tunneled by the gateway server and the third new packet header comprises the source IP address IP(W) and the destination IP address IP(A), and receiving a packets having a fourth new packet header by the second RF module, which is tunneled by the gateway server and the fourth new packet header comprises the source IP address IP(B) and the destination IP address IP(W).

9. The method as claimed in claim 7, wherein the gateway server de-tunnels the tunneled first and second packets, replaces the source IP address IP(U) of the de-tunneled first and second packets with the IP address IP(W) and transmits to the access network.

10. The method as claimed in claim 7, further comprising receiving a tunneled response packet issued by the access network via the gateway server, wherein the gateway server receives a response packet comprising the source IP address IP(Y) and destination IP address IP(W) from the access network, replaces the destination IP address IP(W) of the response packet with the destination IP address IP(U), tunneling the response packet with a fifth new packet header having the source IP address IP(W) and the destination IP address IP(A) or IP(B).

11. The method as claimed in claim 6, further comprising:
de-tunneling the packets received by the first RF module and the second RF module.

12. The method as claimed in claim 6, wherein the first and second packet having the source IP address IP(U) are received from a computer coupled to the mobile station, and the method further comprising transmitting a response packet received from the access network to the computer.

13. A system for handling data transmission between a mobile station with two radio frequency (RF) modules and an access network, comprising:

the mobile station includes a first radio frequency (RF) module corresponding to an IP address IP(A) coupled to a first subscriber identity card to transmit a first packet originally having a source IP address IP(U) and a destination IP address IP(Y) corresponding to the access network and a second radio frequency (RF) module corresponding to an IP address IP(B) coupled to a second subscriber identity card to transmit a second packet originally having a source IP address IP(U) and the destination IP address IP(Y) corresponding to the access network;

a processor performing network address translation (NAT) to assign a portion of packets to be transmitted by the first RF module and assign another portion of packets to be transmitted by the second RF module;

wherein the processor replaces the source IP address IP(U) of the first packet with the source IP address IP(A) corresponding to the first RF module if assigning to the first RF module and the source IP address IP(U) of the second packet with the source IP address IP(B) corresponding to the second RF module if assigning to the second RF module;

transmitting the replaced first packet using the first subscriber identity card to the access network via the first RF module and the replaced second packet using the second subscriber identity card to the access network via the second RF module;

further comprises receiving a first response packet and a second response packet;

wherein the first response packet is received from the access network by the first RF module, wherein the first response packet has the source IP address IP(Y) and the destination IP address IP(A);

replacing, by the processor, the destination IP address IP(A) of the response packet with the destination IP address IP(U);

wherein the second response packet is received from the access network by the second RF module, wherein the second response packet has the source IP address IP(Y) and a destination IP address IP(B); and replacing, by the processor, the destination IP address IP(B) of the response packet with the destination IP address IP(U).

14. The system as claimed in claim 13, wherein the packets sent by the first and second RF modules are generated by a computer, and the system transmits the replaced response packet to the computer.

15. The system as clamed in claim 13, wherein the packets transmitted by the first and second RF module are received by a network operator, and the network operator replaces the replaces the source IP address IP(A) or IP(B) with IP(W).

* * * * *